Oct. 19, 1965    C. A. HILEY    3,212,344
APPARATUS FOR PRODUCING OSCILLATORY MOVEMENT OF A SHAFT
Filed March 7, 1963
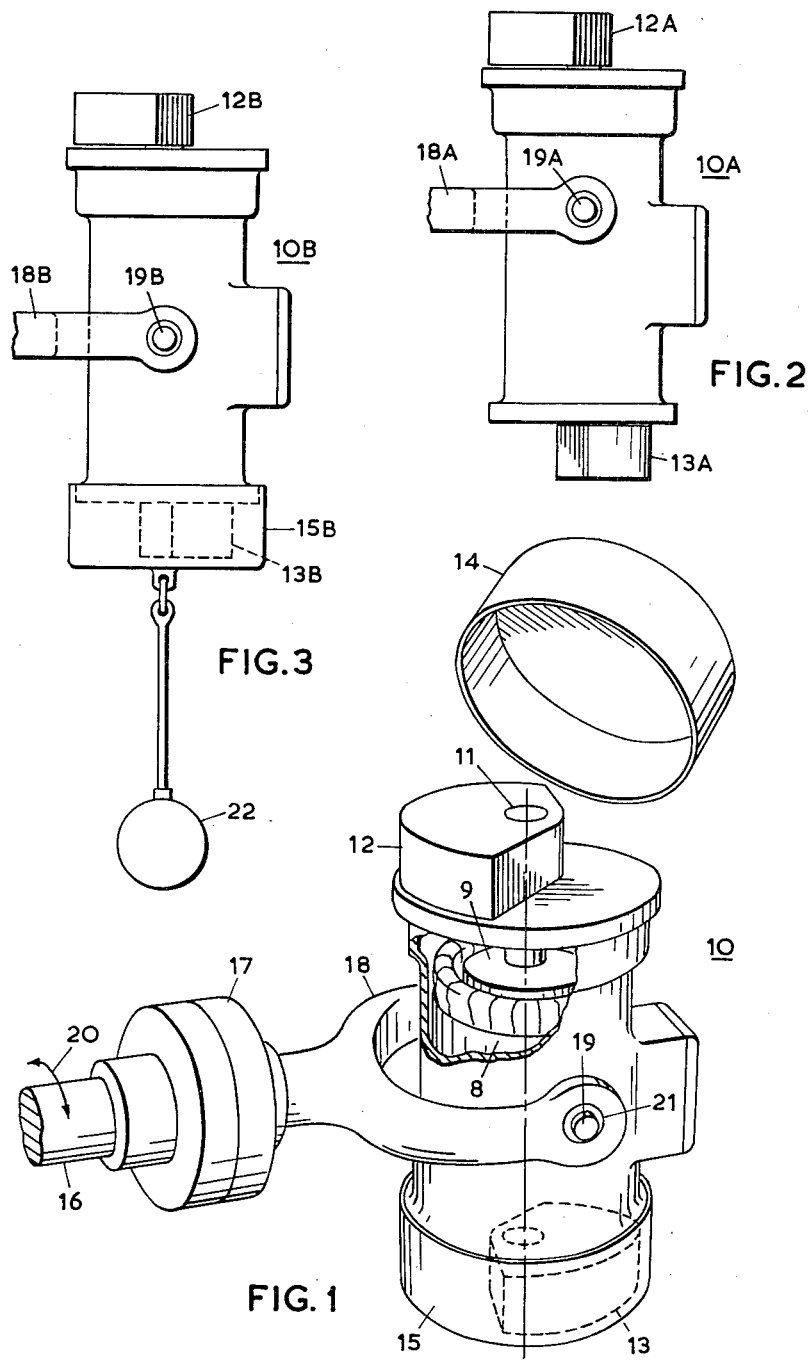

United States Patent Office 3,212,344
Patented Oct. 19, 1965

3,212,344
APPARATUS FOR PRODUCING OSCILLATORY MOVEMENT OF A SHAFT
Charles Adrian Hiley, Bradford, England, assignor to The English Electric Company Limited, London, England, a British company
Filed Mar. 7, 1963, Ser. No. 263,587
Claims priority, application Great Britain, Mar. 13, 1962, 9,587/62
9 Claims. (Cl. 74—61)

This invention relates to apparatus for producing an oscillatory rotary movement of a shaft.

According to one aspect of the invention apparatus for producing an oscillatory rotary movement of a shaft comprises in combination, support means secured to and extending longitudinally from said shaft, a support structure pivotally mounted on the support means so as to be capable of angular movement about a first axis normal to the longitudinal axis of the shaft, a body rotatably mounted in the support structure so as to be capable of rotation about a second axis substantially normal to both the longitudinal axis of the shaft and the first axis, the mass comprising the support structure and the body including means which cause it to have an effective weight which is eccentric relative to both the longitudinal axis of said shaft and the first axis, means for maintaining the second axis substantially normal to the first axis, and means for effecting rotation of the body.

One basic form of apparatus for porducing an oscillatory rotary movement of a shaft, in accordance with the invention, will now be described, by way of example, with reference to the accompanying drawing in which FIG. 1 is a pictorial representation of the basic form of the apparatus and FIGS. 2 and 3 show modifications of the arrangement of FIG. 1.

In the form of the apparatus shown in FIG. 1 the reference numeral 10 denotes an electric motor having a stator 8, a rotor 9 and a rotor shaft 11 which extends from both ends of the motor housing. An out-of-balance weight 12 is secured to one of the rotor shaft extensions and an out-of-balance weight 13 is secured to the other rotor shaft extension at the other end of the machine, the two out-of-balance weights being normally protected by respective caps 14 and 15.

As is shown in the drawing the two out-of-balance weights are displaced 180° relative to one another about the shaft 11.

The motor is supported on a shaft 16, which is the driven shaft, by means of a coupling 17 and a stirrup 18 which engages the motor housing by means of two trunnions 19, of which only one is shown in the drawing.

The two trunnions 19 are so disposed along the length of the motor housing that the motor-weight mass is supported for angular movement about an axis (the first axis) which passes through the centre of gravity of the motor-weight mass and which is normal to the longitudinal axis of the driven shaft 20.

When the motor is energized so that the two out-of-balance weights are rotated (about a second axis) an oscillatory movement will be imparted to the driven shaft 16 as shown by the arrow 20.

In order to obtain the best results from this apparatus it is desirable to maintain the axis of the rotor shaft 11 (the said second axis) in the position shown in the drawing, that is, normal to the axis which passes through the two trunnions 19 (the said first axis) and in order to maintain the motor in this position damping means are provided for damping angular movement of the motor about the trunnions 19. This means for damping the angular movement of the motor may comprise a torsionally soft resilient mounting, such as a rubber bush,
provided in the trunnions, one such rubber bush is shown at 21 in the drawing. Alternatively this damping means may comprise any suitable spring arrangement so that the motor transmits a high proportion of the required torque to the stirrup and thus to the driven shaft.

The apparatus of FIG. 1 can be modified as shown in FIG. 2 in which the motor 10A and the associated apparatus is arranged to operate with the axis of the rotor shaft (the said second axis) in the vertical position but the trunnions 19A are so arranged that the motor-weight mass is supported for angular movement about an axis (the said first axis) which is above the centre of gravity of the motor-weight mass so that the rotor shaft assumes the desired vertical position. With this arrangement, however, the weight 12A at the top end of the rotor is greater than the weight 13A at the bottom end of the rotor so as to ensure dynamic balance and to obtain equal moments about the trunnions, as distinct from the centre of gravity of the motor-weight mass. In all other respects the arrangement of FIG. 2 is the same as that of FIG. 1.

In a further form of the apparatus as shown in FIG. 3 the motor 10B and associated apparatus is arranged to operate with the axis of the rotor shaft (the said second axis) in the vertical position as shown in the drawing with the motor-weight mass supported for angular movement about an axis (the said first axis) which passes through the said centre of gravity of the motor-weight mass and a pendulum 22 is secured to the bottom cap 15B of the motor housing so that the rotor shaft assumes the desired vertical position. In all other respects the arrangement of FIG. 3 is the same as that of FIG. 1.

What I claim as my invention and desire to secure by Letters Patent is:

1. Apparatus for producing an oscillatory rotary movement of a shaft comprising in combination, support means secured to and extending longitudinally from said shaft, a support structure mounted on the support means by pivot means so as to be capable of angular movement about a first axis normal to the longitudinal axis of the shaft, a body rotatably mounted in the support structure so as to be capable of rotation about a second axis substantially normal to both the longitudinal axis of the shaft and the first axis, the mass comprising the support structure and the body including means which cause it to have an effective weight which is eccentric relative to both the longitudinal axis of said shaft and the first axis, said pivot means for maintaining the second axis substantially normal to the first axis, and means for effecting rotation of the body.

2. Apparatus as claimed in claim 1 in which the pivot means for maintaining the second axis substantially normal to the first axis includes means for damping the angular movement of the support structure about the first axis.

3. Apparatus for producing an oscillatory rotary movement of a generally horizontally disposed shaft comprising in combination, a support stirrup secured to and extending longitudinally from said shaft, an electric motor having a housing and a rotor mounted for rotation in the housing, the housing being mounted in the support stirrup by pivot means so that the motor is capable of angular movement about a first axis which passes above the centre of gravity of the motor and which is normal to the longitudinal axis of said shaft and whereby the motor assumes a position in which the rotor is positioned for rotation about a second and generally vertical axis which is thus generally normal to the longitudinal axis of said shaft and to the first axis, and weighting means secured to the rotor whereby the motor is dynamically balanced about the first axis but with the mass comprising the motor and the weighting means eccentric relative to both the longitudinal axis of said shaft and the first axis.

4. Apparatus as claimed in claim 3 in which the weighting means comprise a first out-of-balance weight secured adjacent the lower end of the rotor and a second and greater out-of-balance weight secured adjacent the upper end thereof and displaced 180° relative to the first weight.

5. Apparatus as claimed in claim 3 including means for damping the angular movement of the motor about the first axis.

6. Apparatus for producing an oscillatory rotating movement of a generally horizontally disposed shaft comprising in combination, a support stirrup secured to and extending longitudinally from said shaft, an electric motor having a housing and a rotor mounted for rotation in the housing, the housing being mounted in the support stirrup by pivot means so that the motor is capable of angular movement about a first axis which passes through the centre of gravity of the motor and which is normal to the longitudinal axis of said shaft, a first out-of-balance weight secured adjacent one end of the rotor, a second and like out-of-balance weight secured adjacent the other end of the rotor and displaced 180° relative to the first weight, and a pendulum secured to the motor housing whereby the motor assumes a position in which the rotor is positioned for rotation about a second and generally vertical axis which is thus generally normal to the longitudinal axis of said shaft and to the first axis, with the total weight of the motor and the first and second out-of-balance weights eccentric relative to both the longitudinal axis of the shaft and the first axis.

7. Apparatus as claimed in claim 6 including means for damping the angular movement of the motor about the first axis.

8. Apparatus for producing an oscillatory rotating movement of a shaft comprising in combination, a support stirrup secured to and extending longitudinally from said shaft, an electric motor having a housing and a rotor mounted for rotation in the housing, the housing being mounted in the support stirrup by pivot means so that the motor is capable of angular movement about a first axis which passes through the centre of gravity of the motor and which is normal to the longitudinal axis of said shaft, the rotor being mounted in the housing for rotation about a second axis which is generally normal to the longitudinal axis of said shaft and to the first axis, a first out-of-balance weight secured adjacent one end of the rotor, a second and like out-of-balance weight secured adjacent the other end of the rotor displaced 180° relative to the first out-of-balance weight whereby the effective mass of the motor, the first out-of-balance weight, and the second out-of-balance weight is eccentric relative to the first and second axes, and means for maintaining the second axis substantially normal to the first axis.

9. Apparatus as claimed in claim 8 in which the means for maintaining the second axis substantially normal to the first axis includes means for damping the angular movement of the support structure about the first axis.

References Cited by the Examiner

UNITED STATES PATENTS

| | | | |
|---|---|---|---|
| 2,436,251 | 2/48 | Dobie et al. | 74—61 X |
| 2,807,966 | 10/57 | Servanty | 74—61 X |
| 2,984,125 | 5/61 | Keyser | 74—751 |
| 3,008,336 | 11/61 | Leduc | 74—61 |

FOREIGN PATENTS 141,477    4/20    Great Britain.

OTHER REFERENCES

I.B.M. Bulletin, vol. 3, No. 10, page 13, March 1961.

BROUGHTON G. DURHAM, *Primary Examiner.*